United States Patent
Behan et al.

(10) Patent No.: US 10,610,827 B2
(45) Date of Patent: Apr. 7, 2020

(54) FILTRATION ARTICLES AND METHODS OF MAKING AND USING THE SAME

(71) Applicant: CORNING INCORPORATED, Corning, NY (US)

(72) Inventors: Francis Martin Behan, Corning, NY (US); Amit Halder, Painted Post, NY (US); Benedict Yorke Johnson, Horseheads, NY (US); Edward Zhmayev, Ithaca, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/343,921

(22) PCT Filed: Oct. 20, 2017

(86) PCT No.: PCT/US2017/057544
§ 371 (c)(1),
(2) Date: Apr. 22, 2019

(87) PCT Pub. No.: WO2018/075863
PCT Pub. Date: Apr. 26, 2018

(65) Prior Publication Data
US 2019/0314760 A1 Oct. 17, 2019

Related U.S. Application Data

(60) Provisional application No. 62/416,287, filed on Nov. 2, 2016, provisional application No. 62/410,472, filed on Oct. 20, 2016.

(51) Int. Cl.
*B01D 53/86* (2006.01)

(52) U.S. Cl.
CPC .... *B01D 53/8668* (2013.01); *B01D 2255/104* (2013.01); *B01D 2255/2065* (2013.01);
(Continued)

(58) Field of Classification Search
CPC ................ B01D 46/00; B01D 46/2418; B01D 2046/2433; B01D 53/44; B01D 53/72;
(Continued)

(56) References Cited

U.S. PATENT DOCUMENTS 4,374,814 A * 2/1983 Gaylord ................. B01D 53/72
422/36
5,585,083 A 12/1996 Kielin et al.
(Continued)

FOREIGN PATENT DOCUMENTS

CN 102240549 B 6/2014
CN 203955237 U 11/2014
(Continued)

OTHER PUBLICATIONS

International Search Report and Written Opinion of the International Searching Authority; PCT/US2017/057544; dated Feb. 2, 2018; 13 Pages; Korean Intellectual Property Office.
(Continued)

*Primary Examiner* — Timothy C Vanoy
(74) *Attorney, Agent, or Firm* — Russell S. Magaziner (57) ABSTRACT

A substrate including a conversion catalyst for removing a volatile organic compound from ambient air. The substrate includes at least one porous wall. The conversion catalyst is within the pores of the at least one substrate porous wall.

29 Claims, 3 Drawing Sheets

(52) U.S. Cl.
CPC ............... *B01D 2255/2073* (2013.01); *B01D 2257/708* (2013.01); *B01D 2258/06* (2013.01)

(58) Field of Classification Search
CPC ............ B01D 53/8668; B01D 2201/62; B01D 2239/0464; B01D 2239/1208; B01D 2255/206; B01D 2255/207; B01D 2255/65; B01D 2255/9155; B01D 2255/9205; B01D 2257/708; B01D 2275/30; B01J 32/00; B01J 35/1028; B01J 37/08; B01J 2219/00909; B01J 2219/2432; B01J 35/0093
See application file for complete search history.

(56) References Cited

U.S. PATENT DOCUMENTS

| | | | |
|---|---|---|---|
| 10,150,100 | B2 | 12/2018 | Sidheswaran et al. |
| 2008/0124504 | A1 | 5/2008 | Faber et al. |
| 2011/0118486 | A1 | 5/2011 | Dubois |
| 2012/0305499 | A1* | 12/2012 | England ................ B01D 53/02 210/777 |
| 2016/0107114 | A1 | 4/2016 | Fu et al. |
| 2017/0216769 | A1* | 8/2017 | England ................ B01D 53/72 |
| 2018/0117522 | A1* | 5/2018 | Gaur ..................... B01D 53/02 |

FOREIGN PATENT DOCUMENTS

| | | | | |
|---|---|---|---|---|
| CN | 104174395 | A | 12/2014 | |
| CN | 104338528 | A | 2/2015 | |
| EP | 1676625 | A1 | 7/2006 | |
| EP | 3 317 011 | A1 * | 5/2018 | ......... B01D 53/1487 |
| WO | WO 2017 001961 | A1 * | 1/2017 | ......... B01J 20/3248 |

OTHER PUBLICATIONS

Polinski et al; "Use of Fundamental Concepts in Catalyst Aging in Increase Catalyst Utilization During Coal Liquefaction, Steam Reforming, and Other Carbon-Forming Reactions"; Ind. Eng. Chem. Process Des. Dev.; 1981, 20, pp. 470-475.

* cited by examiner

FILTRATION ARTICLES AND METHODS OF MAKING AND USING THE SAME

This application claims the benefit of priority under 35 U.S.C. § 371 of International Application No. PCT/US17/57544, filed on Oct. 20, 2017, which claims to benefit of priority to U.S. Provisional Application Ser. No. 62/416,287, filed on Nov. 2, 2016, which claims the benefit of priority to U.S. Provisional Application No. 62/410,472, filed on Oct. 20, 2016, the contents of each are relied upon and incorporated herein by reference in their entireties as if fully set forth below.

BACKGROUND

Field

The present disclosure relates generally to filtration articles for removing volatile organic compounds from a target gas stream and methods of making and using said articles.

Technical Background

The quality of indoor ambient plays an important role to human health. Formaldehyde (HCHO) emitted from buildings, furnishing materials and consumer products is one of the most dominant volatile organic compounds (VOCs) in indoor environments. Formaldehyde is known to cause nasal tumors, irritation to various membranes of eyes, respiratory tract, and skin. Due to growing concern over the adverse influence of airborne formaldehyde on health, abatement of formaldehyde completely or, at least, to its maximum permissible exposure level (e.g., ≤0.1 ppm) is desirable in dwellings and at work places. It is of significant practical interest to abate formaldehyde at low temperatures, especially at room temperature.

A survey of existing approaches for formaldehyde removal reveals that catalytic oxidation is the only method that has the potential to continuously and completely eliminate formaldehyde with minimal energy input. To meet the requirements of low energy demand and low formaldehyde concentration for indoor air cleaning, an extremely active catalyst is needed. One of the most active catalysts known currently is supported platinum (Pt), which has proven effective for formaldehyde oxidation even at room temperature. While significant progress has been made recently in developing new Pt-based catalysts, a filter featuring both catalytic effectiveness and cost effectiveness is yet to be developed. Other transition metal based catalysts have been used to oxidize formaldehyde, but these catalysts age during use and have conventionally lost effectiveness quickly over time.

Accordingly, a need exists for a cheaper, longer-lasting catalytic filter with sufficient stability and durability for removing VOCs from indoor ambient air at lower (e.g., room) temperatures.

SUMMARY

According to embodiments of the present disclosure, an article for removing a volatile organic compound from a target gas is disclosed. In embodiments, the article includes a substrate and a conversion catalyst. In embodiments, the substrate includes at least one porous partition wall. In embodiments, the at least one porous partition wall includes a surface area less than about 3000 $m^2/m^3$ and a porosity from about 45% to about 70%. In embodiments, the conversion catalyst is within the pores of the porous partition walls of the substrate.

According to embodiments of the present disclosure, a method for forming an article for removing a volatile organic compound from a target gas is disclosed. In embodiments, the method includes contacting a substrate with a precursor solution including a catalyst salt. In embodiments, the method includes firing the contacted substrate to form a conversion catalyst with an at least one porous partition wall of the substrate.

Before turning to the following Detailed Description and Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings.

DETAILED DESCRIPTION

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the exemplary methods and materials are described below.

Conventional catalytic filtration articles for removing VOCs from a target gas are different than filtration articles of the present disclosure. Conventional filtration articles have included catalysts supported by pellets in a packed bed. This conventional approach has several limitations including: the high surface area of the pellets quickly exposes all the catalyst to the target gas which may cause rapid catalyst aging (particularly in the situation of non-precious metal catalysts); conventional design approaches for packed beds which aim to maximize contact surface area between the target gas and the catalyst may cause rapid degradation and short lifetime of non-precious metal catalysts; and lower surface area packed beds have longer bed lengths that may require larger capital investments to enable a sufficient reaction time in the packed bed.

Another conventional filtration article has included bulk solid supports for catalysts. This conventional approach also has several limitations including: catalyst loading on the surface is typically maximized to increase interaction with the target gas; none of the catalyst is typically protected from immediate interaction with the target gas to improve lifetime of the catalyst; any catalyst within the body of the bulk solid support is typically not accessible by the target gas due to the large loading of catalyst on the surface of the bulk solid support or insufficient diffusion time. Conventional filtration articles have used precious metal-containing catalysts (e.g., gold, silver, platinum) to increase lifetime of the catalyst. However, precious metals are becoming more difficult to obtain and are increasingly expensive.

Disclosed herein are filtration articles for removing volatile organic compounds (VOCs) from a target gas. Filtration articles of the present disclosure comprise a substrate including at least one porous partition wall; and a conversion catalyst within the wall or within the pores of the at least one porous partition wall of the substrate. In embodiments, the substrate includes a plurality of porous partition walls defining a plurality of adjacent flow-through channels. The conversion catalyst of the present disclosure is deposited or loaded within the wall or within the pores of the substrate porous partition walls. In embodiments, at least 95 weight percent (wt. %) or more, such 98 wt. %, of the conversion catalyst is within the wall or within the pores of the substrate porous partition walls. Accordingly, less than 5 wt. %, such as less than 2 wt. %, of the conversion catalyst is on the wall(s) of the substrate porous partition walls. Filtration articles of the present disclosure benefit from the loading of the conversion catalyst in the wall(s). This is compared to conventional loading techniques of the conversion catalyst on the wall(s) or equally within the wall(s) and on the wall(s). Filtration articles of the present disclosure achieve unexpected VOC filtration results from in-wall loading of the conversion catalyst.

Figure 1:
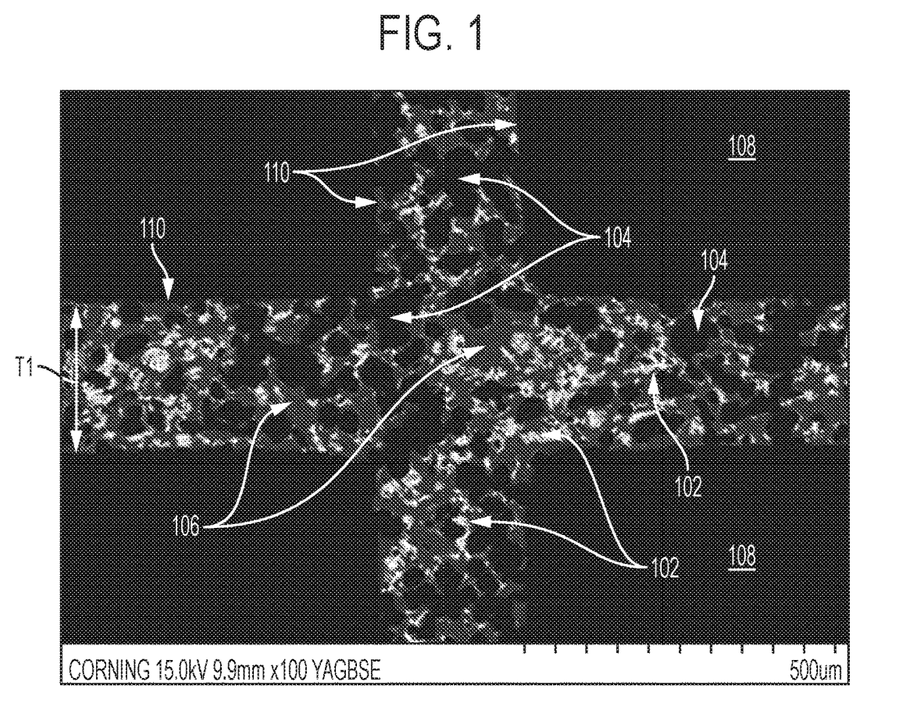
FIG. 1 is a sectional view of a portion of a filtration article, according to embodiments of the present disclosure and Example 1.

The terms "within the wall(s)", "in the wall(s)", "within the wall thickness", "in-wall", "in the pores", and "within the pores" are used interchangeably herein to describe the location of the conversion catalyst with respect to the substrate porous partition walls including: loaded and dispersed within the internal surfaces, pores, and/or "pore necks" of at least one of the substrate porous partition walls; distributed across the entire thickness of at least one of the substrate porous partition walls defined by wall surfaces; inside pores contiguous the substrate partition walls that define the plurality of adjacent flow-through channels; and/ or not a substantially continuous layer on the wall(s) defining the plurality of adjacent flow-through channels. FIG. 1 is a scanning electron microscope (SEM) image of a cross-sectional portion of an about 61% porosity monolithic substrate including the conversion catalyst within the walls according to embodiments of the present disclosure. The porosity of the substrate of FIG. 1 was about 65% prior or catalyst loading. Conversion catalyst 102 (shown as white areas) is within pores 104 (open pores shown as black areas within thickness T1) of walls 106 (shown as grey areas) defined by wall surfaces 110. Wall surfaces define open flow-through channels 108.

The present disclosure provides that in-wall loading of the catalyst in the substrate provides unexpected VOC filtration results. Without being limited to any particular theory, as the target gas flows through the flow-through channels, the in-wall loaded catalyst is not immediately exposed to the target gas. Instead, only the catalyst in the wall and closest to the flow-through channels is first exposed. As filtration operations continue, however, the target gas may diffuse into the wall and interact with the catalyst. That is, degradation of the catalyst may start at the wall surface 110 and progress inward toward the center of the wall over time. In the case of a flow-through substrate, catalyst degradation may start on opposing wall surface and progress toward the wall center as the target gas diffuses into the wall. In the case of a wall-flow substrate (e.g., end plugged diesel-type particulate filter), catalyst degradation may start on one wall surface and progress toward the opposing wall surface as the target gas diffuses across the wall. Without being limited to any particular theory, degradation of the catalyst may be attributed to the accumulation of intermediate reaction products on the catalyst surface from the VOC in the target gas. Thus, the catalyst within the wall of the substrate is protected from rapid degradation by diffusion resistance of the target gas.

Figure 2:
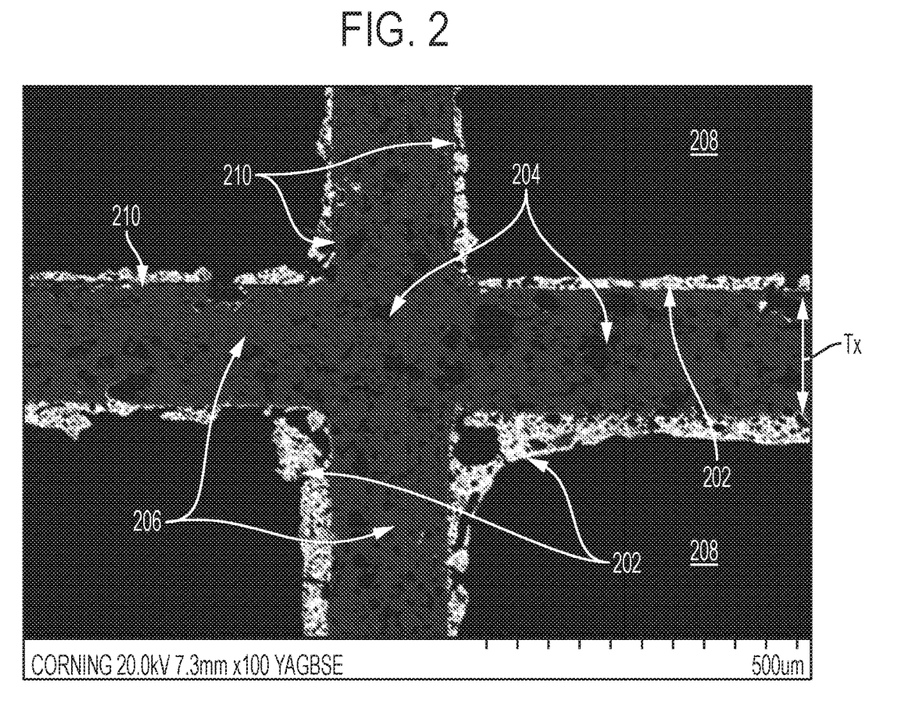
FIGS. 2 & 3 are sectional views of portions of conventional filtration articles described in Comparative Example 1.

The term "on the wall", "on the walls", and "on-wall" are used interchangeably herein to describe the location of the conversion catalyst with respect to the substrate partition walls including: on a surface of the substrate wall(s) and inside at least one of the plurality of adjacent flow-through channels defined by the substrate wall surface(s); and a substantially continuous layer on at least one of the wall(s) defining the plurality of adjacent flow-through channels. FIG. 2 provides an example scanning electron microscope (SEM) image of a cross-sectional portion of an about 65% porosity conventional monolithic substrate including conversion catalyst predominately on the walls thereof. In FIG. 2, conversion catalyst 202 (shown as white areas) is substantially on the wall surfaces 210. Wall surfaces 210 define a thickness Tx of the walls 206 (shown as grey areas) which include pores 204 (open pores shown as black areas within thickness Tx). It can be seen that greater than about 96% of conversion catalyst 202 is on wall surfaces 210 and is within flow-through channels 208.

Figure 3:
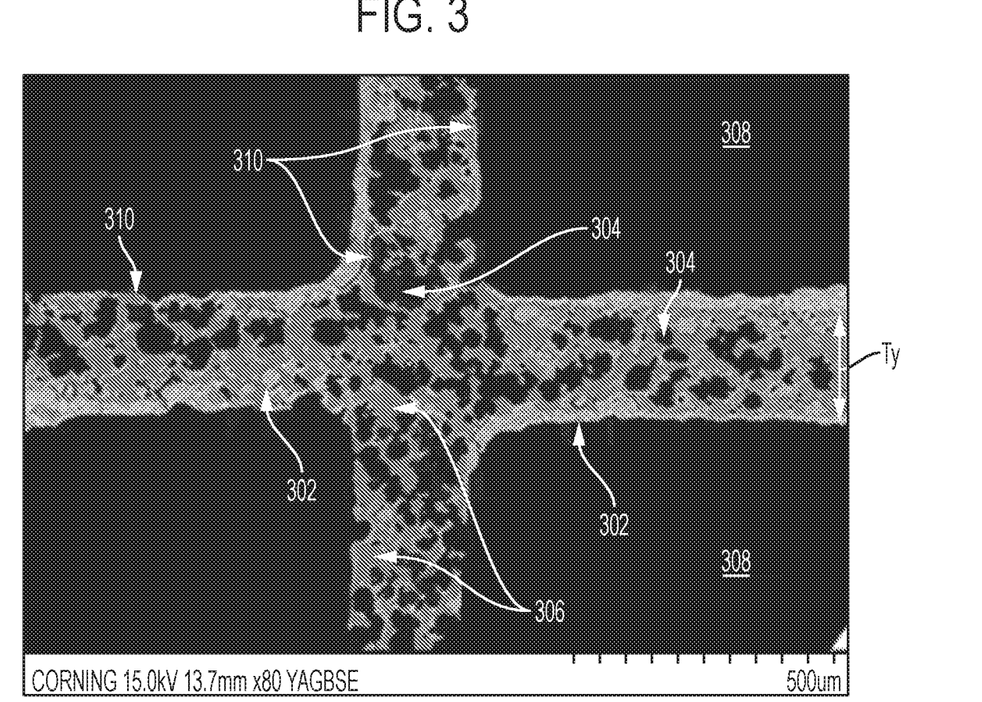

The term "in-wall and on-wall" and "within the wall(s) and on the wall(s)" are used interchangeably herein to describe the location of the conversion catalyst with respect to the substrate partition walls including a combination of the descriptions for "in-wall" and "on-wall" provided above herein. FIG. 3 provides an example scanning electron microscope (SEM) image of a cross-sectional portion of an about 63% porosity conventional monolithic substrate including conversion catalyst in-wall and on-wall. The porosity of the substrate of FIG. 3 was about 65% prior to catalyst loading. In FIG. 3, conversion catalyst 302 (shown as white areas) is both within the wall(s) and on the wall(s) surfaces 310. Wall surfaces 310 define a thickness Ty of the walls 306 (shown as grey areas) which include pores 304 (open pores shown as black areas within thickness Ty). As can be seen, conversion catalyst 302 on wall surfaces 310 is within flow-through channels 308. In-wall and on-wall coating may include <95 wt. % of the conversion catalyst within the walls of the substrate, with >5% on the walls of the substrate.

The substrate of the present disclosure is configured for loading of the conversion catalyst within the pores of the substrate porous partition walls. In embodiments, the substrate is a honeycomb substrate or a monolithic substrate. The substrate of the present disclosure is configured such that the conversion catalyst can be deposited or loaded within the pores of the porous partition walls. The present disclosure provides that in-wall loading of the conversion catalyst in a solid support substrate has led to unexpected VOC filtration results.

Without being limited to any particular theory, the inventors postulate that for target gas volume including a low concentration (e.g., <0.1 ppm) of a VOC, the target gas need only contact a small amount of conversion catalyst for VOC conversion to a desired by-product. This is contrary to conventional understanding that the target gas should contact the maximum amount of catalyst for effective conversion of VOCs. This is also contrary to conventional practices of high on-wall conversion catalyst loading to increase the availability of the conversion catalyst for contact with the VOC containing target gas. Without being limited to any particular theory, the inventors postulate that the rate of aging or degradation of the conversion catalyst is caused by exposure to the target gas. This is contrary to conventional knowledge that the aging or degradation of the conversion catalyst is related VOC conversion rate and conventional solutions of high on-wall loading. Without being limited to any particular theory, the inventors believe that the aging or degradation of the conversion catalyst may be attributed to the accumulation of intermediate reaction products on the catalyst which may reduce catalyst interaction with the target gas. Without being limited to any particular theory, the inventors also believe that in-wall loading of the conversion catalyst protects or guards a majority of the conversion catalyst from contact with the target gas. Thus, a majority of the in-wall loaded conversion catalyst is temporarily protected from the target gas stream flowing through the flow-through channels and can only be accessed by target gas diffusion into the wall.

The present disclosure provides the conversion catalyst is within the wall or within the pores of the at least one porous partition wall of the substrate. The present disclosure provides exemplary properties of the substrate and the conversion catalyst such that: the catalyst can be loaded within the walls of the substrate partition walls; the conversion catalyst is protected from rapid degradation when the filtration article is exposed to the target gas stream; VOCs in the target gas stream are able to diffuse into the wall of the substrate and contact the conversion catalyst therein enabling a longer conversion catalyst lifetime; and the filtration article has a pressure drop low enough for VOC separation processes (e.g., ≤100 Pa, ≤75 Pa, ≤50 Pa, etc.).

Methods of making the filtration article of the present disclosure include contacting the substrate with a precursor solution comprising a catalyst salt. In embodiments, the catalyst salt is a metal salt including manganese nitrate, cerium nitrate, magnesium sulfate, manganese chloride, and combinations thereof. The catalyst salt may also include other metal salts which contain a desired metal element for a constituent metal oxide desired for the conversion catalyst. In some non-limiting embodiments, the catalyst salt concentration in the precursor solution can range from about 1% to about 50% by weight, such as from about 2% to about 40%, from about 3% to about 30%, from about 4% to about 25%, from about 5% to about 20%, from about 6% to about 15%, from about 7% to about 10%, or from about 8% to about 9% by weight, including all ranges and subranges therebetween. In embodiments, the precursor solution may include a liquid carrier comprising water, acetone, ethanol, propanol, ethylene glycol, dimethyl sulfoxide (DMSO), N,N-dimethylformamide (DMF), N-methyl-2-pyrrolidone (NMP), pyridine, tetrahydrofuran (THF), dicholormethane, xylene, hexane, and combinations thereof. The liquid carrier may be configured such that the catalyst salt does not substantially change (e.g., >±5%) the viscosity of the precursor solution and is able to flow into the walls of the substrate. In embodiments, the catalyst salt dissolves in the liquid carrier. The viscosity of the precursor solution is configured to allow the precursor solution to flow into the walls and pores of the substrate. In embodiments, contacting the precursor solution and the substrate may include rinsing, washing, or flowing the solution over the substrate. In example methods, contacting the substrate and the precursor solution includes bath immersion, recirculated washing (with or without vacuum), channel flushing, and similar methods to maximize contact between the precursor solution and the substrate and thereby improve in-wall loading of the precursor solution in the substrate.

Methods of making the filtration article include firing the precursor solution contacted substrate to form the conversion catalyst within the substrate porous partition walls. Firing the precursor solution contacted substrate may include heating, baking, or calcining at a temperature from about 100° C. to about 600° C. In embodiments, firing the solution contacted substrate oxidizes the catalyst salt at least partially. In embodiments, firing the precursor solution contacted substrate removes or evaporates at least a portion of the liquid carrier. In embodiments, firing the precursor solution contacted substrate may include heating at a temperature above the evaporation point of the liquid carrier in the precursor solution. In embodiments, removal or evaporation of the liquid carrier in the precursor solution leaves the conversion catalyst (or base metal oxide (BMO)) within the walls of the substrate. In embodiments, the substrate including the BMO may be contacted with another precursor solution including a silver nitrate salt. In embodiments, the substrate may be fired again (similar to that described above) to form a silver oxide coating on the in-wall BMO particles.

Methods of using the filtration article of the present disclosure include contacting the filtration article with the target gas to remove at least a portion of any VOC from the target gas. The terms "target gas", "target gas stream", and "target gas volume" are used interchangeably herein to describe continuous stream or constant volume of a gas containing any amount of a VOC. In embodiments, the VOC is the species selected for separation from said target gas by filtration articles disclosed herein. In embodiments, volatile organic compound(s) (VOC or VOCs) may include benzene, ethylene glycol, formaldehyde, methylene chloride, tetrachloroethylene, toluene, xylene, 1,3-butadiene, and combinations thereof. In embodiments, the conversion catalyst of the present disclosure is configured to reduce, oxidize, remove, or convert VOCs from the target gas to a desirable by-product (e.g., water, carbon dioxide, oxygen, etc.). In the case where the VOC is formaldehyde, formaldehyde concentration in the target gas may be from about 100 ppb to about 10 ppm, such as from about 0.1 ppm to about 2 ppm, such as from about 0.5 ppm to about 1.5 ppm, including all ranges and subranges therebetween. In embodiments, the target gas is at about room temperature (e.g., 25° C.). In embodiments, the target gas (e.g., air) may be from the interior of an enclosure or building or from the exterior of a building or enclosure. In embodiments, the target gas may have a flow rate from about 1 L/min to about 7000 L/min, from about 50 L/min to about 1500 L/min, from about 100 L/min to about 1250 L/min, or from about 750 L/min to about 1000 L/min, including all ranges and subranges therebetween. The target gas flow rate may be pushed or pulled by a fan or other gas pump through the filtration article. In embodiments, the target gas flows from an inlet end to an outlet end of the filtration article through the flow-through channels. In embodiments, the target gas diffusing into the walls of the filtration article contacts the conversion catalyst contained therein. The conversion catalyst of the present disclosure reduces, oxidizes, removes, or converts the VOCs in the target gas upon contact therewith.

Filtration articles disclosed herein may provide improved filtration efficiency while also exhibiting a relatively low pressure drop "penalty" (e.g., the difference between the pressure drop of the unloaded substrate and the pressure drop of the loaded substrate). As used herein, the term "pressure drop" refers to the resulting pressure drop of a fluid as it flows through the substrate or filter, from the inlet end to the outlet end. Pressure drop measurements and values provided herein refer to the "initial" pressure drop of the substrate, e.g., the first pass through the substrate before it becomes loaded with catalyst. It is understood that pressure drop across a substrate naturally tends to increase as the substrate becomes increasingly loaded with catalyst and/or other particulate matter. In some embodiments, the pressure drop of the filtration articles may be less than about 500 Pa, such as less than about 400 Pa, less than about 300 Pa, less than about 200 Pa, or less than about 100 Pa, e.g., ranging from about 50 Pa to about 500 Pa, including all ranges and subranges therebetween. According to additional embodiments, the pressure drop penalty of the loaded substrate as compared to an unloaded substrate (of similar composition and construction) may be less than about 200 Pa, such as less than about 150 Pa, less than about 100 Pa, less than about 75 Pa, less than about 50 Pa, or less than about 25 Pa, e.g., ranging from about 25 to about 200 Pa, including all ranges and subranges therebetween. In embodiments, the target gas flow rate and pressure drop across the filtration article depends on the cross-sectional area of the reactor and the velocity of gas through the reactor.

The substrate of the present disclosure includes at least one porous partition wall. In embodiments, the substrate is a monolithic substrate or a honeycomb substrate. In embodiments, the substrate includes a plurality of porous partition walls defining a plurality of adjacent flow-through channels. In embodiments, a cross-sectional area of the plurality of flow-through channels is from about 60% to about 90%, or from about 65% to about 85%, of a total cross-sectional area of the honeycomb substrate. The substrates may also have any variety of configurations and designs including, but not limited to, flow-through monolith, wall-flow monolith, or partial-flow monolith structures. Exemplary flow-through substrates include any structure comprising channels, porous networks, or other passages through which the target gas can flow from one end of the structure to the other. Exemplary wall-flow substrates include, for example, any structure comprising channels or porous networks or other passages which may be open or plugged at opposite ends of the structure, thereby directing fluid flow through the channel walls as it flows from one end of the structure to the other. Exemplary partial-flow substrates can include any combination of a wall-flow monolith with a flow-through monolith, e.g., having some channels or passages open on both ends to permit the fluid to flow through the channel without blockage. In certain embodiments, the substrate may have a honeycomb shape, e.g., a structure comprising a plurality of parallel channels or cells. In embodiments, the includes adjacent flow-through channels having a substantially hexagonal cross-section (e.g., in a plane perpendicular to the target gas flow plane), it is to be understood that the channels can have any suitable geometry, for example, circular, square, triangular, rectangular, or sinusoidal cross-sections, or any combination thereof. In embodiments, the substrate can have any variety of shapes including, but not limited to, spherical, oblong, pyramidal, cubic, or block shapes, to name a few.

In embodiments, the substrate includes an inorganic material. In embodiments, the substrate includes a glass, a glass-ceramic, or combinations thereof. In embodiments, the substrate comprises cordierite, mullite, silicon carbide, silicon nitride, aluminum titanate, calcium aluminate, zirconium phosphate, spodumene, and combinations thereof. Other conventionally known extrudable, porous materials are in accordance with the present disclosure.

Honeycomb substrates are often described in terms of cells (or channels) per square inch (CPSI) of surface area of a cross-section of the substrate, as well as interior wall thickness ($10^{-3}$ inches). Thus, a honeycomb comprising 300 cells/in$^2$ and a wall thickness of 0.008 inches would be labeled as a 300/8 honeycomb, and so forth. Exemplary honeycombs may comprise from about 100 to about 600 cells/in$^2$ (15.5-93.0 cells/cm$^2$), such as from about 110 to about 400 cells/in$^2$ (15.5-62 cells/cm$^2$), such as from about 150 to about 400 cells/in$^2$ (23.25-62 cells/cm$^2$), or from about 200 to about 300 cells/in$^2$ (31-46.5 cells/cm$^2$), including all ranges and subranges therebetween. Increasing the number of cells per unit area may increase the pressure drop across the filtration article. According to embodiments, the porous partition wall thickness T1 can range from about 0.007 inches to about 0.02 inches (178-508 microns), such as from about 0.010 to about 0.016 inches (254-406 microns), such as from about 0.010 to about 0.014 inches (254-356 microns), from about 0.011 to about 0.016 inches (279-406 microns), e.g., about $8\times10^{-3}$, $9\times10^{-3}$, $10\times10^{-3}$, $11\times10^{-3}$, $12\times10^{-3}$, $13\times10^{-3}$, $14\times10^{-3}$, $15\times10^{-3}$, $16\times10^{-3}$, $17\times10^{-3}$, $18\times10^{-3}$, $19\times10^{-3}$, $20\times10^{-3}$ inches or more, including all ranges and subranges therebetween. Increasing the thickness T1 of the porous partition walls may allow for loading more conversion catalyst in the walls. Larger wall thickness may also increase the diffusion time of the target gas across the thickness T1 of the wall thus protecting the catalyst at the center of the wall and may increase the lifetime (and reduce degradation) of the conversion catalyst.

In embodiments, thickness T1 of a porous partition wall is defined between adjacent flow-through channels of the substrate. According to embodiments, the porous partition wall thickness T1 is greater than about $10\times10^{-3}$ inches (or greater that about 254 microns) such that some of the conversion catalyst within the wall is protected from interaction with the target gas in the flow-through channels, and is only exposed to the target gas via diffusion of the target gas into the walls. The honeycomb substrate lengths and/or diameters can range from one to several inches, such as from about 1 inch to about 100 inches (2.54-254 cm), from about 1 inch to about 36 inches (2.54-91.44 cm), from about 12 inches to about 24 inches (30.48-60.96 cm), including all ranges and subranges therebetween. The length of the substrate may be increased for higher concentrations of VOCs in the target gas and the diameter of the substrate may be increased for larger target gas volumes and flow rates.

In embodiments, the porosity of the porous substrate refers to pores within the porous partition walls. The porous ceramic substrate can have any desired 3-dimensional shape, such as a cube, block, pyramid, cylinder, sphere, or the like, with any suitable width, length, height, and/or diameter. In various embodiments, the porous ceramic substrate may be formed as a monolithic structure, for example, via extruding and/or molding techniques. Those having ordinary skill in the art are familiar with the various techniques for making such ceramic monolithic structures. In embodiments, the porous substrate has a porosity from about 10% to about 90%, or from about 40% to about 70%, or from about 45% to about 70%, or from about 45% to about 65%, such as about 35%, 40%, 45%, 50%, 55%, 60%, 65%, 70%, 75%, 80%, 85%, or greater including all ranges and subranges therebetween. This porosity of the porous substrate refers to the porosity before the substrate includes the conversion catalyst, also referred to as "the substrate unloaded porosity" herein.

In certain non-limiting embodiments, the pores within the porous partition walls of the substrate have a mean pore size ($D_{50}$) from about 1 micron to about 100 microns, such as ranging from about 2 microns to about 50 microns, such as from about 10 microns to about 50 microns, such as from about 10 microns to about 30 microns, or from about 15 to about 25 microns, or including all ranges and subranges in between, e.g., about 11, 12, 13, 14, 15, 16, 17, 18, 19, 20, 21, 22, 23, 24, 25, 26, 27, 28, 29 or more microns, including all ranges and subranges therebetween. Additionally, in some embodiments, it may be desirable to limit the number of larger pores in the ceramic substrate, e.g., such that pores from about 50 microns to about 150 microns or greater make up less than about 10% of the total porosity ($D_{90}$). For example, pores greater than about 150 microns may make up less than about 8%, less than about 5%, or less than about 2% of the total porosity of the substrate. Similarly, in some embodiments, it may be desirable to limit the number of smaller pores in the ceramic substrate, e.g., such that pores from about 10 microns to about 1 micron or less make up less than about 10% of the total porosity ($D_{10}$). For example, pores smaller than about 5 microns may make up less than about 8%, less than about 5%, or less than about 2% of the total porosity. This pore size of the porous substrate refers to the porosity before the substrate includes the conversion catalyst. In embodiments, the pores of the porous partition walls of the substrate are tortuously interconnected. In embodiments, the pores of the porous partition walls of the substrate are interconnected and form at least one flow path through the wall. In embodiments, the walls of the substrate have a tortuosity from about 1 to about 10, such as from about 3 to about 7, such as from about 4 to about 6, including ranges and subranges therebetween.

In certain non-limiting embodiments, the porous substrate includes a surface area less than about 3000 meters squared per meter cubed of substrate ($m^2/m^3$). In embodiments, the surface area refers specifically to the surface area on the at least one porous partition wall or one the plurality of porous partition walls. The surface area does not include the surface area within the walls of the substrate or the surface area of the surface pores. That is, the surface area is calculated as if the partition walls were perfectly flat, without indentations. In embodiments, the porous substrate includes a surface area from about 1000 $m^2/m^3$ to about 3000 $m^2/m^3$, such as from about 1500 $m^2/m^3$ to about 3000 $m^2/m^3$, such as from about 1500 $m^2/m^3$ to about 2500 $m^2/m^3$, such as 1250 $m^2/m^3$, 1500 $m^2/m^3$, 1750 $m^2/m^3$, 2000 $m^2/m^3$, 2250 $m^2/m^3$, 2500 $m^2/m^3$, 2750 $m^2/m^3$ up to about 3000 $m^2/m^3$, including all ranges and subranges therebetween. This surface area of the porous substrate refers to the surface area before the substrate includes the conversion catalyst, also referred to as "the substrate unloaded surface area" herein. The inventors have discovered that the substrate unloaded surface area disclosed herein allows for desired loading of the conversion catalyst within the walls; provides for desired contact of the target gas with the conversion catalyst during filtration methods; and protects at least a portion of the conversion catalyst from the target gas until the target gas diffuses from the flow-through channels into the walls of the porous substrate. This is contrary to conventional filtration articles which maximize the surface area of the substrate, including greater than 3000 $m^2/m^3$, without consideration of implication to catalyst degradation.

In non-limiting embodiments, the substrate includes a surface area less than 2500 $m^2/m^3$, porosity greater than 60%, wall thickness greater than 254 microns, and the conversion catalyst within the walls of the substrate. In non-limiting embodiments, the substrate includes a surface area from about 1500 $m^2/m^3$ to about 2500 $m^2/m^3$, porosity from about 45% to about 70%, a wall thickness greater than 254 microns, and the conversion catalyst within the walls of the substrate. In embodiments, the substrate may include any combination of characteristics disclosed herein including the conversion catalyst within the walls thereof.

In embodiments, the conversion catalyst is loaded within the wall or within the pores of the at least one porous partition wall of the substrate. That is, in embodiments, the conversion catalyst is provided within at least a portion of the substrate unloaded porosity. In embodiments, the conversion catalyst is loaded within the pores of the porous partition walls of the substrate. In embodiments, the loaded porous partition walls include from about 0.01 g to about 1.0 g of catalyst per cubic centimeter of the substrate ($g/cm^3$), such as from about 0.04 to about 0.10 $g/cm^3$, such as from about 0.05 to about 0.09 $g/cm^3$, or from about 0.06 to about 0.08 $g/cm^3$. In embodiments, the loaded porous partition walls include 0.01 g to about 1.0 g of catalyst per gram of the substrate (g/g), such as from about 0.01 to about 0.9 g/g, such as from about 0.1 to about 0.9 g/g, such as from about 0.1 to about 0.5 g/g, or from about 0.15 to about 0.4 g/g.

In embodiments, the conversion catalyst includes an oxide of at least one of: manganese, molybdenum, tin, cerium, scandium, titanium, vanadium, chromium, iron, cobalt, nickel, and combinations thereof. In embodiments, the conversion catalyst includes an oxide of at least one of: manganese, molybdenum, tin, cerium, and combinations thereof. In embodiments, the conversion catalyst includes MnOx (where x=1, 2, or 4), $MoO_3$, $SnO_2$, $CeO_2$, and combinations thereof. In embodiments, the conversion catalyst is essentially free of a precious metal (e.g., gold, silver, platinum) or precious metal oxides. In embodiments, the conversion catalyst includes less than about 1.0 wt. %, or less that 0.1 wt. %, precious metal or precious metal oxides. The conversion catalyst is loaded into the pores of the porous partition walls according to the methods disclosed herein. In an embodiment, the substrate is impregnated with the precursor solution then fired to form the conversion catalyst or BMO in the walls of the substrate. In embodiments, the conversion catalyst may be coated with another oxide, including silver oxide, after formation in the walls of the substrate.

In embodiments, the conversion catalyst in the walls of the substrate includes a median particle size from about 10 microns to about 80 microns, such as from about 20 microns to about 50 microns, e.g., about 25, 30, 35, 40, 45 or more microns, including all ranges and subranges therebetween. The porosity of the at least one porous partition wall of the substrate decreases when the conversion catalyst is loaded therein. That is, the porosity of the substrate loaded with conversion catalyst in the walls is less than the substrate unloaded porosity. In embodiments, the porosity of the substrate loaded with conversion catalyst in the walls is from about 5% to about 70%, such as from about 25% to about 75%, such as from about 35% to about 60%, or from about 40% to about 55%, including all ranges and subranges therebetween. In embodiments, the substrate loaded porosity is up to 10% less, such as 9, 8, 7, 6, 5, 4, 3, 2, 1%, than the substrate unloaded porosity.

A ratio Rx is the ratio of the porosity of the porous partition walls when the catalyst in loaded within the pores of the porous partition walls (i.e., the substrate loaded porosity) to the surface area of the porous partition walls. That is, ratio Rx is represented by the following expression:

$$Rx = \frac{\text{loaded porosity (\%)}}{\text{substrate surface area}\left(\frac{m^2}{m^3}\right)}$$

In embodiments, the ratio Rx for the filtration article is greater that about 0.017. In embodiments, the ratio Rx for the filtration article is from about 0.017 to about 0.028, or about 0.019 to about 0.027.

In embodiments, filtration articles of the present disclosure have a VOC filtration efficiency of at least 30% to about 99%, such as at least about 45%, at least about 50%, at least about 60%, at least about 70%, at least about 85%, or at least about 90%, or at least 95% or greater, e.g., ranging from about 50% to about 99%, including all ranges and subranges therebetween. In embodiments, the filtration efficiency is greater than about 40% for at least 40 hours of filtration (assuming for constant flow rates and concentrations), or at least 45 hours, or at least 50 hours, or at least 55 hours, or at least 60 hours, or at least 65 hours, or at least 70 hours or more of filtrations, including all ranges and subranges therebetween. In embodiments, the filtration efficiency is greater than about 40% for 4,380 hours or more, or 8,760 hours (i.e., 1 year) or more. The filtration efficiency of the filtration article can be measured by comparing the VOC concentration in the target gas before and after the target gas passes through the filtration article. Filtration efficiency (FE) is calculated using the following equation:

$$FE = \frac{\text{inlet } VOC \text{ concentration} - \text{oulet } VOC \text{ concentration}}{\text{inlet } VOC \text{ concentration}}$$

For a continuous stream of the target gas, the filtration efficiency of the filtration article decreases over time due to catalyst degradation or aging. For a target gas filtration operation, cumulative clean mass (CCM) of the filtration article may be calculated using the following equation:

CCM=ΣFE×inlet VOC concentration×volumetric flow rate×time

CCM refers to the amount (mass) of VOC captured during the target filtration operation. In embodiments, the CCM of filtration articles of the present disclosure is from about 1 gram to about 100 grams, or from about 5 grams to about 18 grams. In embodiments, the weight ratio of CCM to catalyst loading in the wall of the substrate for filtration articles of the present disclosure is from about 1 g/g to about 5 g/g, or from about 1 g/g to about 4 g/g, or from about 2 g/g to about 4 g/g, or even from about 2.33 g/g to about 3.87 g/g. In embodiments, the substrate includes from about 0.01 gram to about 100 grams of conversion catalyst.

EXAMPLES

The present disclosure will be further clarified with reference to the following examples which are intended to be non-restrictive and illustrative only.

Example 1

Six cordierite honeycomb substrates, each 1 inch in diameter and 4 inches long, were obtained. After determining the volume within the pores of the substrate and the desired loading of catalyst, a precursor solution was prepared for each in-wall loading of each substrate. The precursor solution for each substrate was prepared by mixing cerium nitrate hexahydrate powder (e.g., from about 26 g to 44 g) and manganese nitrate tetrahydrate powder (e.g., from about 14 g to about 23 g) such that the molar ratio of cerium to manganese was about 1.1. The cerium nitrate and manganese nitrate powder mixture was mixed with distilled water to form the precursor solution. The amount of mixed metal salts and distilled water were back calculated from the total pore volume of the substrate to achieve the desired catalyst loading therein. Each of the six substrates were submerged in their respective precursor solutions to fill the pores within the porous partition walls.

The substrates were removed from the precursor solution and shaken and air-knifed to remove any residual precursor solution from their flow-through channels. The precursor solution contacted substrates were each dried in a humidity controlled oven at about 180° C. for about 2 hours, and then fired at about 400° C. in a highly ventilated oven (to remove decomposing nitrates therefrom) for about 90 minutes. The dried substrates where then removed from the oven allowed to cool to room temperature. After that, 5.83 g of silver nitrate was dissolved in 100 ml of DI water. Then base metal oxide (BMO) coated honeycomb substrates prepared above were soaked in the silver nitrate salt for about 1 minute. After clearing the channels, the substrates were dried in air-vented oven at 180° C. Finally, the substrates were fired in an air-vented furnace at 300° C. for 2 hours to form silver oxide on the BMO particles. The properties of each of the six substrates are provided in Table 1 below. FIG. 1 is a SEM image of a cross-sectional portion of the filtration article including substrate 5.

TABLE 1

| | Substrate # | | | | | |
|---|---|---|---|---|---|---|
| | 1 | 2 | 3 | 4 | 5 | 6 |
| CPSI | 230 | 300 | 400 | 300 | 300 | 300 |
| Wall thickness (inches) | 8 × 10$^{-3}$ | 9 × 10$^{-3}$ | 4 × 10$^{-3}$ | 8 × 10$^{-3}$ | 10 × 10$^{-3}$ | 7 × 10$^{-3}$ |
| Unloaded Substrate weight (g) | 16.5 | 18.45 | 7.4 | 13.27 | 12.5 | 10.5 |
| Pore volume (cm$^3$/g) | 0.22 | 0.38 | 0.88 | 0.50 | 0.78 | 0.77 |

TABLE 1-continued

Figure 5:
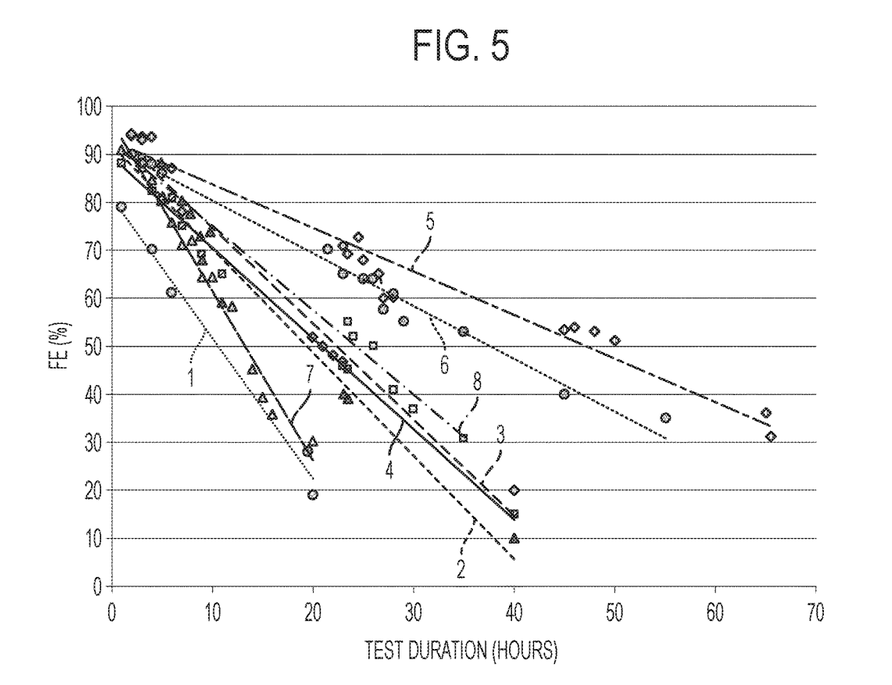
FIG. 5 is a graph illustrating the filtration efficiency (FE) vs. time for the filtration articles of the present disclosure compared to conventional filtration articles.

| | Substrate # | | | | | |
|---|---|---|---|---|---|---|
| | 1 | 2 | 3 | 4 | 5 | 6 |
| Unloaded Porosity | 35% | 48% | 66% | 56% | 65% | 65% |
| D50 (microns) | 4.2 | 19.8 | 15.8 | 12.8 | 20.9 | 20.9 |
| OFA (%) | 77.21 | 71.25 | 84.64 | 74.21 | 68.34 | 77.22 |
| Surface Area ($m^2/m^3$) | 2099 | 2302 | 2898 | 2350 | 2255 | 2397 |
| Catalyst loading (g) | 3.2 | 3.2 | 3.3 | 3.3 | 3.1 | 3.2 |
| Catalyst Location | In-wall | In-wall | In-wall | In-wall | In-wall | In-wall |
| Catalyst loading (g)/ Unloaded Substrate weight (g) | 0.19 | 0.17 | 0.44 | 0.24 | 0.24 | 0.30 |
| Loaded porosity | 28.5% | 42.9% | 56.1% | 50.1% | 60.5% | 58.0% |
| CCM (grams) | 3.5 | 6.5 | 8 | 9 | 12 | 10.6 |
| CCM/catalyst loading (g/g) | 1.09 | 2.03 | 2.42 | 2.72 | 3.87 | 3.31 |
| Rx | 0.0136 | 0.019 | 0.019 | 0.021 | 0.027 | 0.0246 |
| SEM image | N/A | N/A | N/A | N/A | FIG. 1 | FIG. 3 |
| Data points in FIG. 5 | Purple circles | Blue triangles | Orange diamonds | Black squares | Blue diamonds | Pink circles |

The formaldehyde removal efficiency evaluation of the six filtration articles of Example 1 was performed in a fixed-bed reactor, at room temperature, and under atmospheric pressure. The filtration articles were individually wrapped with Fiberfrax ceramic fiber insulation and inserted into a reactor tube. The tested supported catalysts were exposed to formaldehyde laden air. Gaseous formaldehyde was generated by a nebulizer that converted a formaldehyde solution into an aerosol. The formaldehyde flow, which was driven by nitrogen, was then mixed with air, leading to a typical feed gas composition of 1 ppm formaldehyde. The total flow rate was 52 L/min, corresponding to a gas hourly space velocity (GHSV) of 104,000 $h^{-1}$. The outlet concentration of formaldehyde was measured for each filtration article to calculate the filtration efficiency. The data points in FIG. 5 each indicate a measurement. Testing was stopped when the filtration efficiency of the filtration article reached about 30%. The filtration efficiencies of the six filtration articles are provided and labeled in FIG. 5. The filtration efficiency (FE) measurements for each of the six substrates in FIG. 5 are fitted with a line to show the approximate filtration efficiency trend of filtration articles of the present disclosure. The CCM for each filtration article was calculated and is provided above in Table 1.

Figure 4:
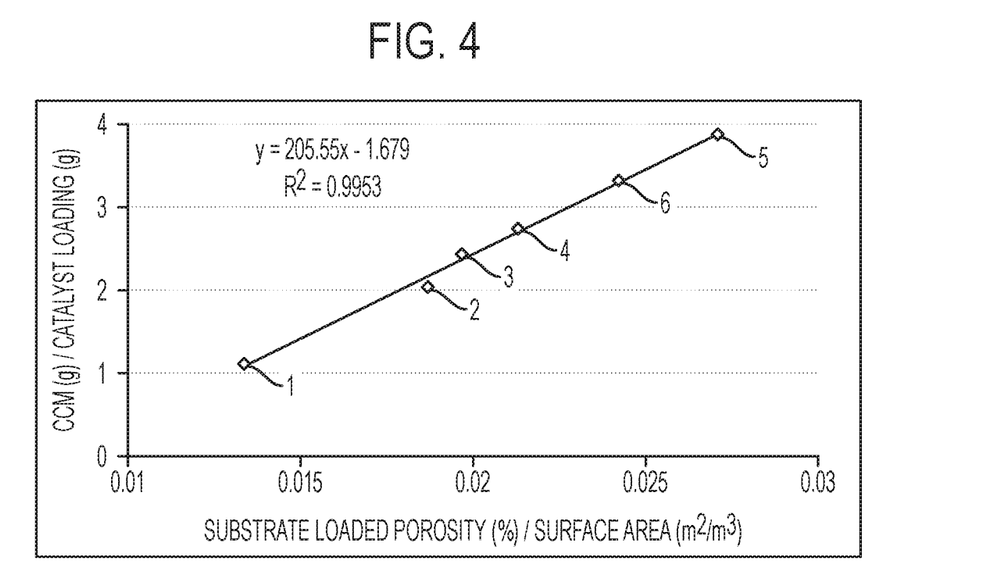
FIG. 4 is a graph illustrating the linear relationship of cumulative clean mass (CCM) (g)/catalyst loading (g) vs. substrate loaded porosity (%)/substrate surface area ($m^2/m^3$) for the six filters described in Example 1.

FIG. 4 is a graph illustrating a linear relationship between cumulative clean mass (CCM) (g)/catalyst loading (g) vs. substrate loaded porosity (%)/substrate surface area ($m^2/m^3$) for the six filters described above. A high R-squared value of the linear relationship (>99%) means that the reactor performance is dependent on two geometric and material variables: loaded porosity and surface area (with other process parameters kept constant). Filtration efficiency of filtration articles of the present disclosure is directly proportional to loaded porosity and inversely proportional to loaded surface area. The linear relationship of the experimental data is described by the following equation:

$$\frac{CCM\ (g)}{catalyst\ loading\ (g)} = 205.55 \times \frac{substrate\ loaded\ porosity\ (\%)}{substrate\ surface\ area\ \left(\frac{m^2}{m^3}\right)} - 1.679$$

Comparative Example 1

Two comparative honeycomb substrates, each 1 inch in diameter and 4 inches long, were obtained. After determining the volume within the pores of the substrate and the desired loading of catalyst, a precursor solution was prepared for each similar to that in Example 1. However, 20 mL of ammonium hydroxide was provided in the precursor solution for each of these two comparative substrates to precipitate the catalyst out of the solution. Subsequently, the two substrates where dipped into the precursor solution to wash coat the solution thereon.

Residual precursor solution was removed from the substrate flow-through channels with an air-knife. The precursor solution contacted substrates were each dried in an air-vented oven at about 180° C. for about 2 hours, and then fired at about 250° C. in air-vented oven (to remove decomposing nitrates therefrom) for about 90 minutes. The dried substrates where then removed from the oven allowed to cool to room temperature. The properties of the two comparative substrates are provided in Table 2 below.

TABLE 2

| | Comparative Substrate # | |
|---|---|---|
| | 7 | 8 |
| CPSI | 300 | 300 |
| Wall thickness (inches) | $10 \times 10^{-3}$ | $10 \times 10^{-3}$ |
| Unloaded Substrate weight (g) | 12.5 | 12.5 |
| Pore volume ($cm^3/g$) | 0.78 | 0.80 |
| Porosity | 65% | 65% |

TABLE 2-continued

| | Comparative Substrate # | |
|---|---|---|
| | 7 | 8 |
| D50 (microns) | 20.9 | 20.9 |
| OFA (%) | 68.34 | 68.34 |
| Surface Area ($m^2/m^3$) | 2255 | 2255 |
| Catalyst loading (g) | 3.0 | 3.0 |
| Catalyst location | On-wall | In-wall and on-wall |
| Catalyst loading (g)/Unloaded Substrate weight (g) | 0.24 | 0.24 |
| CCM (grams) | 4.5 | 7.0 |
| CCM/catalyst loading (g/g) | 1.5 | 2.33 |
| Rx | 0.026 | 0.026 |
| SEM image | FIG. 2 | FIG. 3 |
| Data points in FIG. 4 | Green triangles | Red Squares |

Each of the two comparative substrates were tested for formaldehyde filtration efficiency under the same conditions as described in Example 1. Testing was stopped when the filtration efficiency of the filtration article reached about 30%. The filtration efficiencies of the comparative filtration articles from substrates 7 & 8 over time is provided in FIG. 5. The CCM for each comparative filtration article was calculated and is provided above in Table 2. FIG. 5 provides that in-wall loading of the catalyst may result in a higher filtration efficiency (FE) over a longer period of time.

As used herein, the singular forms "a," "an," and "the" include plural referents unless the context clearly dictates otherwise. Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is also noted that recitations herein refer to a component of the present invention being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

What is claimed is:

1. An article comprising:
    a honeycomb substrate comprising a plurality of porous partition walls defining a plurality of adjacent flow-through channels,
        the porous partition walls comprise a surface area from about 1500 $m^2/m^3$ to about 3000 $m^2/m^3$ and a porosity from about 45% to about 70%,
    a conversion catalyst within the pores of the porous partition walls of the honeycomb substrate, and
        the conversion catalyst removes a volatile organic compound from a target gas.
2. The article of claim 1 wherein 95 wt. % or more of the conversion catalyst is within the pores of the porous partition walls.
3. The article of claim 1 wherein less than 5 wt. % of the conversion catalyst is on the walls of the porous partition walls.
4. The article of claim 1, wherein at least one of the porous partition walls has a thickness of about 177 microns or greater between adjacent flow-through channels.
5. The article of claim 1, wherein the porous partition walls have a thickness from about 254 microns to about 635 microns between adjacent flow-through channels.
6. The article of claim 1, wherein the honeycomb substrate comprises cordierite, mullite, or combinations thereof.
7. The article of claim 1, wherein the conversion catalyst is essentially free of a precious metal or precious metal oxide.
8. The article of claim 1, wherein the honeycomb substrate includes from about 100 to about 400 flow-through channels per square inch.
9. The article of claim 1, wherein the pores within the porous partition walls have a mean pore size from about 10 microns to about 50 microns.
10. The article of claim 1, wherein the conversion catalyst has a mean particle size from about 20 microns to about 50 microns.
11. The article of claim 1, wherein the volatile organic compound is formaldehyde.
12. The article of claim 1, wherein the conversion catalyst comprises an oxide of at least one of: manganese, molybdenum, tin, cerium, scandium, titanium, vanadium, chromium, iron, cobalt, nickel, and combinations thereof.
13. The article of claim 1, wherein the porous partition walls include a porosity from about 35% to about 60% when the conversion catalyst is loaded within the pores of the porous partition walls.
14. The article of claim 1, wherein a cross-sectional area of the plurality of flow-through channels is from about 60% to about 90% of a total cross-sectional area of the honeycomb substrate.
15. A formaldehyde filtration article comprising:
    a substrate comprising a plurality of porous partition walls defining a plurality of flow-through channels, the porous partition walls comprise a surface area,
    a formaldehyde conversion catalyst loaded within the pores of the porous partition walls of the substrate,
        the porous partition walls comprise a porosity when the catalyst is loaded within the pores of the porous partition walls, and
        wherein a ratio of the porosity of the porous partition walls when the catalyst is loaded within the pores of the porous partition walls to the surface area of the porous partition walls is greater than about 0.017.
16. The article of claim 15 wherein the porous partition walls include an unloaded porosity from about 45% to about 70% prior to loading with the conversion catalyst.
17. The article of claim 15 wherein the porous partition walls include a surface area from about 1500 $m^2/m^3$ to about 3000 $m^2/m^3$.
18. The article of claim 15, wherein at least 95 wt. % or more of the catalyst is within the pores of the porous partition walls of the substrate.
19. The article of claim 15, wherein less than 5 wt. % of the catalyst is on the walls and outside of the pores of the porous partition walls of the substrate.
20. The article of claim 15, wherein the catalyst comprises an oxide of at least one of: manganese, molybdenum, tin, cerium, and combinations thereof.

21. The article of claim 15, claims 15-20 wherein the catalyst is essentially free of a precious metal or precious metal oxide.

22. The article of claim 15, wherein the pores within the porous partition walls have a mean pore size from about 10 microns to about 50 microns.

23. The article of claim 15, wherein the pores within at least one of the porous partition walls are tortuously interconnected to form at least one flow path through the wall.

24. The article of claim 15, wherein the catalyst has a mean particle size from about 20 microns to about 50 microns.

25. The article of claim 15, wherein the porous partition walls have a thickness about 177 microns to about 635 microns between adjacent flow-through channels.

26. The article of claim 15, wherein the substrate includes from about 100 to about 400 flow-through channels per square inch of the cross-section of the substrate.

27. The article of claim 15, wherein the loaded porous partition walls include from about 0.01 to about 0.10 grams of catalyst per cubic centimeter of the substrate.

28. A method of making the article of claim 1 comprising:
contacting the substrate with a precursor solution comprising a catalyst salt, and
firing the contacted substrate to form a conversion catalyst within the pores of the porous partition walls.

29. A method of using the article of claim 1 comprising:
contacting the article with a target gas to remove at least a portion of any formaldehyde from the target gas.

* * * * *